United States Patent
Yamamoto

(12) 
(10) Patent No.: US 6,409,454 B1
(45) Date of Patent: Jun. 25, 2002

(54) SUSPENDING MEMBER BREAKAGE PREVENTING MECHANISM IN SPARE WHEEL HOLDING APPARATUS

(75) Inventor: Tomio Yamamoto, Aichi-ken (JP)

(73) Assignee: Sankokiki Kabushiki Kaisha, Aichi-Ken (JP)

( * ) Notice: Subject to any disclaimer, the term of this patent is extended or adjusted under 35 U.S.C. 154(b) by 2 days.

(21) Appl. No.: 09/587,897

(22) Filed: Jun. 6, 2000

(30) Foreign Application Priority Data

Jun. 17, 1999 (JP) ............................................. 11-170774

(51) Int. Cl.[7] ................................................. B66D 1/58
(52) U.S. Cl. ........................................ 414/463; 254/323
(58) Field of Search ............................ 254/323; 414/463

(56) References Cited

U.S. PATENT DOCUMENTS 4,059,197 A * 11/1977 Iida ......................... 254/323 X
4,544,136 A * 10/1985 Denman et al. ............. 254/323

FOREIGN PATENT DOCUMENTS

| JP | 49-23178 | 6/1974 |
| JP | 10053167 | 2/1998 |
| JP | 2768661 | 4/1998 |

* cited by examiner

Primary Examiner—Janice L. Krizek
(74) Attorney, Agent, or Firm—McDermott, Will & Emery

(57) ABSTRACT

A suspending member breakage preventing mechanism in a spare wheel holding apparatus. The spare wheel holding apparatus is provided with a wheel support member on which a spare wheel is supported, and a winding device having a suspending member which connects the wheel support member to the falling end of the suspending member. The winding device is provided with a case, a main shaft, and a planetary gear mechanism. In the planetary gear mechanism, an internal gear is provided on the side surface of the winding drum, and an eccentric cam is provided on the main shaft, and an external gear is rotatably fitted to the eccentric cam. A rotation restricting plate is provided to the side surface of the external gear, and a rotation restricting pin is provided on the case and serves also as a safety pin. If the winding-off force applied to the suspending member is larger than at normal state, the rotation restricting pin is broken thereby the breakage of the suspending member is prevented.

8 Claims, 6 Drawing Sheets

F I G. 3
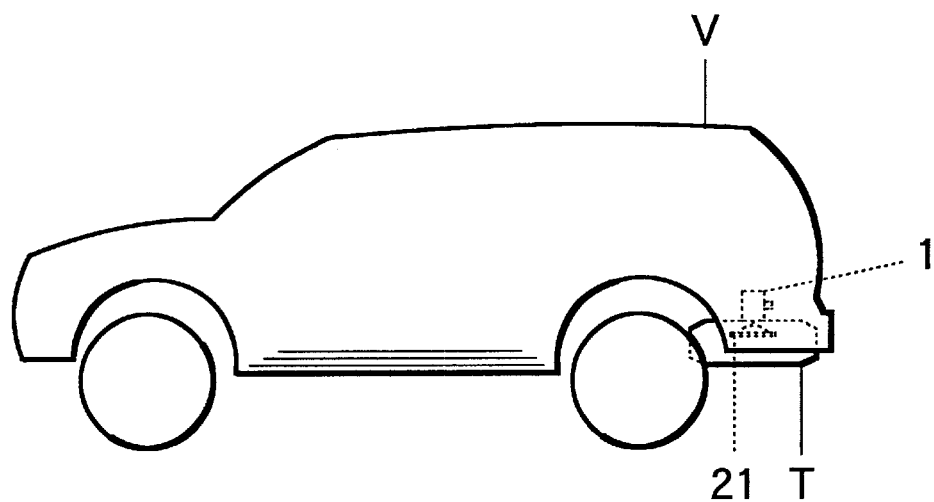

(a)

(b)

(a)

(b)

(a)

(b)

SUSPENDING MEMBER BREAKAGE PREVENTING MECHANISM IN SPARE WHEEL HOLDING APPARATUS

BACKGROUND OF THE INVENTION

1. Field of the Invention

The present invention relates to a mechanism of preventing breakage of a member for suspending a spare wheel in an apparatus for holding a spare wheel to a motor vehicle.

2. Prior Art

1) A spare wheel holding apparatus is provided with a wheel support member for supporting a spare wheel, and a winding device of large reduction ratio for winding up the wheel support member. The wheel support member is connected to the falling end of a suspending member such as a chain or a wire rope of the winding device.

In a large transportation vehicle such as a truck or a middle or small passenger car such as a wagon, as shown in FIG. 3, a winding device of a spare wheel holding apparatus is installed at the lower side of a car body V, and a spare wheel T is wound up and held to the lower surface of the car body V.

In the case that the spare wheel T is held to the lower surface of the car body V, being different from the case that the spare wheel is stored in the car body, when the motor vehicle collides, large forces may be applied to the spare wheel and a large winding-off force may be applied to the suspending member of the winding device.

When the large winding-off force is applied to the suspending member of the winding device, since the winding device has large reduction ratio, the suspending member is not wound off and is broken. If the suspending member is broken, the spare wheel and the wheel support member are separated from the car body and run with inertia on a road and may collide with a walker, other motor vehicle or the like, resulting in dangerous state.

2) The present inventor has invented a spare wheel holding apparatus for preventing breakage of a suspending member of a winding device, as disclosed in JP-B 2768661.

In the spare wheel holding apparatus, a winding device is constituted by a case having vertical cross-section in nearly portal shape, and a main shaft is supported to a front side plate and a rear side plate of the case, and a winding drum on which a suspending member is to be wound is fitted rotatable to the main shaft, and a planetary gear mechanism having large reduction ratio is provided.

The planetary gear mechanism is constituted in that an internal gear is provided concentrically to the side surface of the winding drum, an eccentric cam is provided on the main shaft, an external gear is fitted rotatable to the eccentric cam, the internal gear and the external gear are meshed with each other in relation of the inside and the outside, and a rotation restricting plate is fixed to the side surface of the external gear so that the left end or the right end of the rotation restricting plate abuts on the top plate of the case thereby the rotation is restricted. When the winding-off force is applied to the suspending member, the right end of the rotation restricting plate abuts on the top plate of the case.

The right end of the rotation restricting plate is made desired weak strength. If the winding-off force applied to the suspending member is larger than that during normal use, the weak right end of the rotation restricting plate is broken, and the winding drum is rotated reversely and the suspending member is wound off thereby the breakage of the suspending member is prevented.

In such a spare wheel holding apparatus where breakage of a suspending member of a winding device is prevented, on the occasion that large winding-off force is applied to the suspending member by the collision of a motor vehicle and a rotation restricting plate is broken at the weak right end and a winding drum is rotated reversely and the winding member is wound off, when the winding drum is rotated reversely by turn of about three-fourths, the strong left end of the rotation restricting plate abuts on the top plate of the case, and the reverse rotation of the winding drum is stopped and the suspending member is no more wound off.

If the large winding-off force is applied to the suspending member even after the strong left end of the rotation restricting plate abuts on the top plate of the case and the reverse rotation of the winding drum is stopped, the suspending member is not wound off and will be broken. In the case that large winding-off force is applied to the suspending member continuously or intermittently for a long time, it is difficult to prevent the breakage of the suspending member securely.

In the weak right end of the rotation restricting plate, in order to set the strength to a desired value, thickness or shape is adjusted. However, when the thickness of the rotation restricting plate is adjusted, the range of increasing or decreasing the thickness is narrow. Also when the shape of the rotation restricting plate is adjusted, in order to correct a punch and a die for blanking the rotation restricting plate much labor is required.

Setting of the strength in the weak right end of the rotation restricting plate is not easy. Setting of the winding-off force for the suspending member of the winding device to start the winding-off is difficult.

Even if the winding-off force applied to the suspending member is the same, the weak right end of the rotation restricting plate may be broken or may not be broken depending on the position of the eccentric cam. In other words, the winding-off force of the suspending member that the weak right end of the rotation restricting plate is broken is different depending on the position of the eccentric cam. Consequently it is very difficult that the weak right end of the rotation restricting plate is always broken and the winding drum is rotated reversely when the winding-off force applied to the suspending member becomes a definite value or more.

In order to clarify the reason, the state that the winding-off force is applied to the suspending member will be considered from the standpoint of mechanics.

As shown in FIG. 6(a), if winding-off force W is applied to a suspending member 8, winding-off, moment W·a will be generated about the rotation center axis of the main shaft 3, where "a" is a definite value and means distance between the winding-off force W and the rotation center axis of the main shaft 3, i.e., the length of the arm of the winding-off moment.

In FIG. 6(a), by the winding-off moment W·a in the counterclockwise direction, a winding drum 6 and an internal gear as one body, an external gear and a rotation restricting plate 31 as one body, and a main shaft 3 and an eccentric cam 9 as one body are subjected to the rotational force in the counterclockwise direction, and the weak right end 32 of the rotation restricting plate 31 abuts on a top plate of the case 2. The right end 32 of the rotation restricting plate 31 is subjected to reaction force from the contact point position of the top plate of the case 2 with the right end 32. Then by the reaction force, moment in the clockwise direction about the rotation center axis of the main shaft 3 is generated in the external gear and the rotation restricting plate 31 as one body, the winding drum 6 and the internal gear as one body, and the main shaft 3 and the eccentric cam 9 as one body. The moment in the clockwise direction by the reaction force balances with the winding-off moment W·a in the counterclockwise direction.

As shown in FIG. 6(a), when the center of the eccentric cam 9 is positioned at the right upper side of the rotation center axis of the main shaft 3 and gets near the contact point of the right end of the rotation restricting plate 31 with the top plate of the case 2, the distance between the contact point and the rotation center axis of the main shaft 3 becomes L1. The distance L1 is the length of the arm of the clockwise moment by the reaction force R1. The clockwise moment R1·L1 by the reaction force R1 balances with the counterclockwise winding-off moment W·a.

On the contrary, as shown in FIG. 6(b), when the center of the eccentric cam 9 is positioned at the left lower side of the rotation center axis of the main shaft 3 and gets away from the contact point of the right end 32 of the rotation restricting plate 31 with the top plate of the case 2, the distance between the contact point and the rotation center axis of the main shaft 3, that is, the length: of the arm of the clockwise moment by the reaction force R2 becomes L2. The clockwise moment R1·L2 by the reaction force R2 balances with the counterclockwise winding-off moment W·a.

The arm length L1 in the former and the arm length L2 in the latter are different by about two times of the eccentric distance between the eccentric cam 9 and the main shaft 3. Consequently assuming that the clockwise moment R1·L1 by the reaction force R1 and the clockwise moment R1·L2 by the reaction force R2 balance with the same counterclockwise winding-off moment W·a and become the same value, since the arm length L1 and the arm length L2 of the moment are different, difference is produced in the amount of the force of the moment and in the amount of the reaction force R1 and the reaction force R2.

As a result, even if the winding-off force W applied to the suspending member 8 is the same, depending on the position of the eccentric cam 9, the reaction force R1 and the reaction force R2 to bend the right end 32 of the rotation restricting plate 31 to the right lower side are different in amount, and the right end 32 of the rotation restricting plate 31 may be broken or may not be broken.

SUMMARY OF THE INVENTION

In a spare wheel holding apparatus where when a winding-off force larger than that in normal use state is applied to a suspending member of a winding device, the suspending member of the winding device is wound off thereby breakage of the suspending member is prevented, a first object of the present invention is to provide a suspending member breakage preventing mechanism where even if a winding-off force larger than that in normal use state is applied to a suspending member for a long time, breakage of the suspending member is prevented.

In the above-mentioned spare wheel holding apparatus, a second object of the present invention is to provide a suspending member breakage preventing mechanism where a winding-off force for the suspending member of the winding device to start the winding-off can be easily set.

In the above-mentioned spare wheel holding apparatus, a third object of the present invention is to provide a suspending member breakage preventing mechanism where when a winding-off force applied to the suspending member becomes nearly a constant value or more, breakage of the suspending member is always prevented.

The present invention is as follows.

1) A suspending member breakage preventing mechanism in a spare wheel holding apparatus, wherein the spare wheel holding apparatus is provided with a wheel support member on which a spare wheel is supported, and a winding device having a suspending member which connects the wheel support member to the falling end of the suspending member, the winding device is provided with a case, a main shaft supported on the case, a winding drum for winding the suspending member, said drum being rotatably fitted to the main shaft, and a planetary gear mechanism having large reduction ratio, the planetary gear mechanism is constituted in that an internal gear is provided concentrically on the side surface of the winding drum, and an eccentric cam is provided on the main shaft, and an external gear is rotatably fitted to the eccentric cam, and the internal gear and the external gear in eccentricity are meshed in relation of the inside and the outside, and a rotation restricting plate is provided to the side surface of the external gear, and a rotation restricting pin is provided on the case so that the rotation restricting plate abuts on the rotation restricting pin and the rotation of the external gear on its own axis is restricted, the rotation restricting pin serves also as a safety pin where the strength is set so that when a winding-off force is applied to the suspending member, the rotation restricting plate abuts on the rotation restricting pin, and when the winding-off force applied to the suspending member is larger than that at the normal use state, the rotation restricting pin is broken, and when the rotation restricting pin serving also as the safety pin is broken, the winding drum can be rotated reversely by one turn or more, and the suspending member is wound off thereby the breakage of the suspending member is prevented.

2) In the above-mentioned suspending member breakage preventing mechanism, when a winding-off force is applied to the suspending member of the winding device, distance between the contact point of the rotation restricting plate abutting on the rotation restricting pin serving also as the safety pin and the rotation center axis of the main shaft is substantially constant irrespective of the position of the eccentric cam.

3) In the above-mentioned suspending member breakage preventing mechanism, the rotation restricting plate is provided with a groove in the direction from the circumferential surface toward the eccentric cam, and the rotation restricting pin serving also as the safety pin is inserted in the groove.

4) In the above-mentioned suspending member breakage preventing mechanism, the case of the winding device is fixed to a car body of a motor vehicle, and the spare wheel supported on the wheel support member is wound up and held to the lower surface of the car body.

When large force is applied to a spare wheel supported on a wheel support member by collision of a motor vehicle, and a winding-off force larger than that in normal use state is applied to a suspending member of a winding device, in the winding device, a rotation restricting pin serving also as a safety pin abutting on a rotation restricting plate is broken and a winding drum is rotated reversely and the suspending member is wound off thereby breakage of the suspending member is prevented. When the rotation restricting pin serving also as the safety pin is broken, since the winding drum can be rotated reversely by one turn or more, even if the large winding-off force is applied to the suspending member continuously or intermittently for a long time, breakage of the suspending member is prevented.

In the rotation restricting pin serving also as the safety pin, the strength can be set to a desired value by adjusting diameter and the setting of the strength is easy. The setting of the winding-off force for the suspending member of the winding device to start the winding-off by the breakage of the rotation restricting pin serving also as the safety pin is easy.

When the winding-off force is applied to the suspending member of the winding device, since distance between the contact point of the rotation restricting plate abutting on the rotation restricting pin serving also as the safety pin and the rotation center axis of the main shaft becomes substantially constant irrespective of the position of the eccentric cam, the winding-off force of the suspending member for the rotation restricting pin serving also as the safety pin to be broken is scarcely varied by the position of the eccentric cam and becomes substantially constant value. When the winding-off force applied to the suspending member becomes substantially constant value or more, the rotation restricting pin serving also as the safety pin is always broken and the winding drum is rotated reversely and the breakage of the suspending member is prevented.

BRIEF DESCRIPTION OF THE DRAWINGS

FIG. 3 is a schematic side view of the state that the spare wheel holding apparatus is mounted to the lower side of a car body of a motor vehicle;

DETAILED DESCRIPTION OF THE PREFERRED EMBODIMENT

Figure 1:
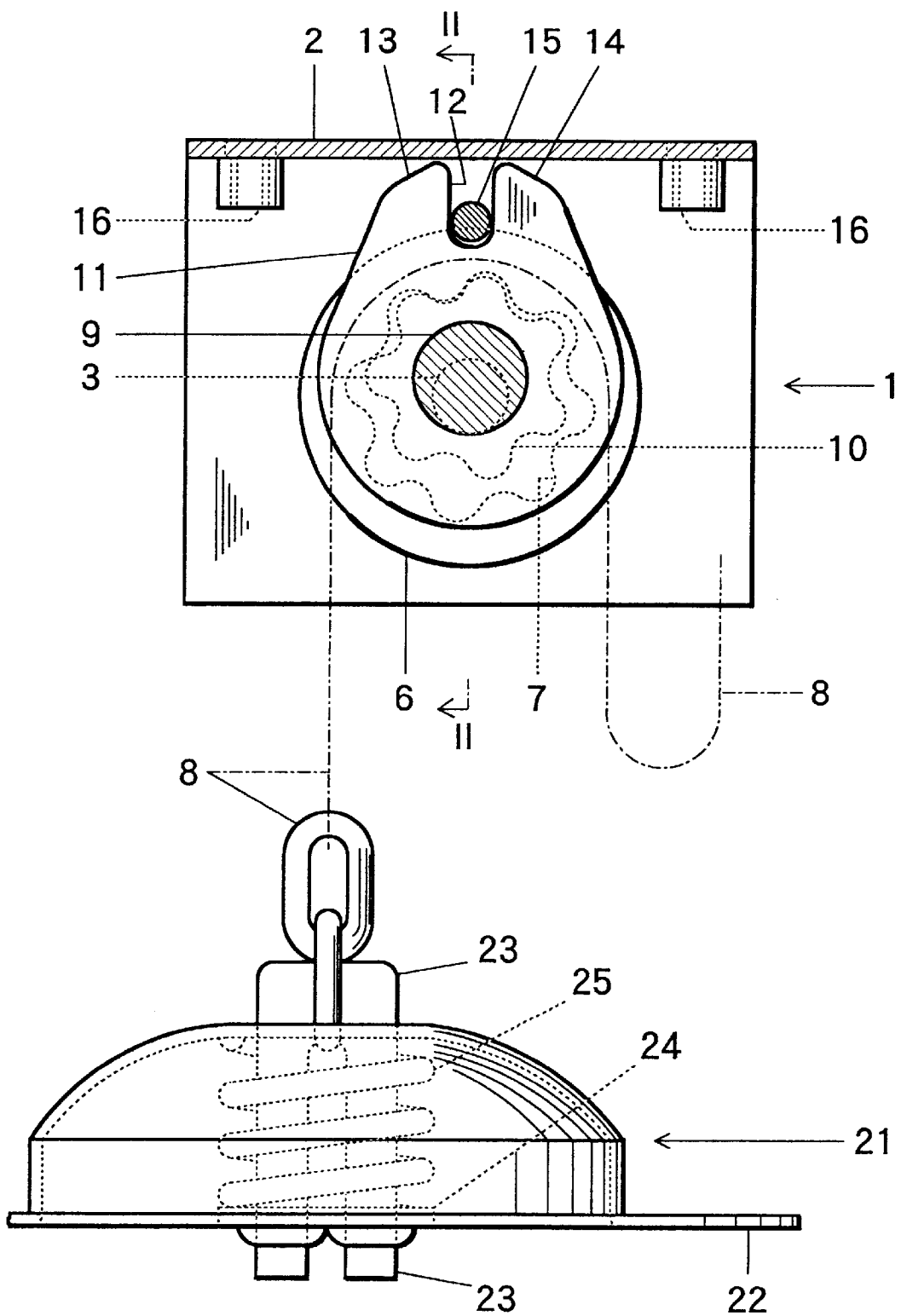
FIG. 1 is a front view of a spare wheel holding apparatus with a suspending member breakage preventing mechanism in an embodiment of the invention, where a winding device is cut in line I—I of FIG. 2 and the left end of a wheel support member is cut away.
Figure 2:
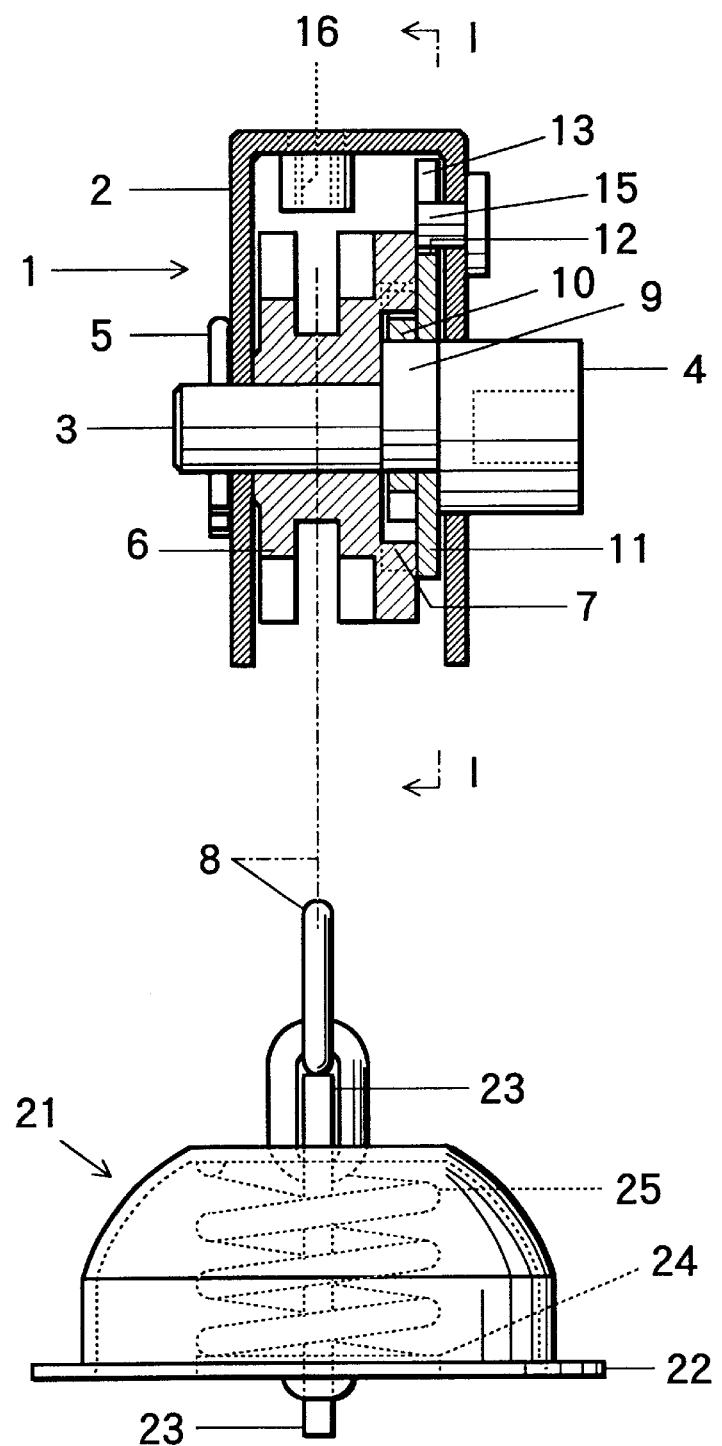
FIG. 2 is a left side view of the spare wheel holding apparatus, where the winding device is cut in line II—II of FIG. 1.

A spare wheel holding apparatus, as shown in FIG. 1 and FIG. 2, is provided with a wheel support member 21 which supports a spare wheel,, and a winding device 1 which winds up the wheel support member 21. The centeral portion of the wheel support member 21 is connected to the falling end of a suspending member 8 of the winding device 1.

The winding device 1, as shown in FIG. 2, is constituted by a case 2 of vertical cross-section in portal shape, and a main shaft 3 in circular cross-section which penetrates the front side plate and the rear side plate of the case 2 and is supported by the case 2. A mouthpiece 4 of large diameter at the front end of the main shaft 3 is projected at the front side of the case 2. The rear end of the main shaft 3 is projected at the rear side of the case 2, and a slipping-out preventing pin 5 is mounted on the projected rear end of the main shaft 3. In order to rotate the main shaft 3, a rotating tool (not shown) is connected to the mouthpiece 4 and is rotated.

At the rear portion of the main shaft 3, as shown in FIG. 2, a winding drum 6 of a chain wheel is rotatably fitted in concentrical state. In the winding drum 6, as shown in FIG. 1 and FIG. 2, a suspending member 8 of a chain is hung to a chain groove on the outer circumference of the winding drum 6 and is wound. The right end of the suspending member 8 is fixed to the right lower end of the front side plate of the case 2. The left end of the suspending member 8 is hung down under the case 2.

The winding device 1 is provided with a planetary gear mechanism having large reduction ratio.

In the planetary gear mechanism, as shown in FIG. 1 and FIG. 2, an internal gear 7 is formed concentrically at the front side surface of the winding drum 6. The winding drum 6 and the internal gear 7 as one body are arranged within the case 2. At the front portion of the main shaft 3, an eccentric cam 9 with circular cross-section is formed to the main shaft 3 as one body in eccentric state. In the eccentric cam 9, an external gear 10 having the teeth number less than that of the internal gear 7 is rotatably fitted in concentrical state. The internal gear 7 of the sun gear and the external gear 10 of the planet gear are in eccentricity and are meshed in relation of the inside and the outside. A rotation restricting plate 11 is fixed to the front side surface of the external gear 10. The external gear 10 and the rotation restricting plate 11 as one body are arranged within the case 2.

At the tip end of the upper end of the rotation restricting plate 11, as shown in FIG. 1, a groove 12 of uniform width is formed in the direction from the circumferential surface of the tip end toward the center of the eccentric cam 9. The left side and the right side of the groove 12 of the rotation; restricting plate 11 are made a left side projection 13 and a right side projection 14 respectively. In the rotation restricting plate 11, the tip end is made fork end shape.

In the front side plate of the case 2, as shown in FIG. 2, a rotation restricting pin 15 with a head penetrates in the longitudinal direction and is fixed. As shown in FIG. 1, the rotation restricting pin 15 penetrates in the longitudinal direction and is inserted in the groove 12 in the vertical direction of the rotation restricting plate 11. When the winding-off force is applied to the left end of the suspending member 8, the right side projection 14 of the rotation restricting plate 11 abuts on the rotation restricting pin 15.

The spare wheel holding apparatus is provided with a suspending member breakage preventing mechanism.

In the suspending member breakage preventing mechanism, the rotation restricting pin 15 is made a round shaft, and diameter of the round shaft is adjusted and strength of the round shaft is set to a desired value. The rotation restricting pin 15 serves also as a safety pin. When the winding-off force applied to the suspending member 8 becomes a value larger than that at normal use state and smaller than the breakage load of the suspending member 8, the right side projection 14 of the rotation restricting plate 11 is not broken but the rotation restricting pin 15 serving also as the safety pin is broken.

When the rotation restricting pin 15 serving also as the safety pin 15 is broken, the winding drum 6 can be rotated reversely by one turn or more. More correctly, the winding drum 6 can be rotated reversely by many turns until the right end side of the suspending member 8 is strained.

In the top plate of the case 2, as shown in FIG. 1, bolt holes 16 are provided at right and left positions. The case 2 is fixed to lower side of a car body of a motor vehicle using the right and left bolt holes 16.

In the wheel support member 21, as shown in FIG. 1 and FIG. 2, the center part of a support plate 22 is curved upward in dome shape. The center part in dome shape of the support plate 22 is fitted to a hub hole of a spare wheel, and a peripheral part of the hub hole of the spare wheel is put on the peripheral part of the support plate 22.

At the center position of the dome-shaped center part of the support plate 22, a suspending piece 23 is penetrated in the vertical direction. A receptacle piece 24 is fixed to the lower end of the suspending piece 23. A coil spring 25 penetrates the suspending piece 23 and is fitted between the receptacle piece 24 and the dome-shaped center part of the support plate 22. The left end of the suspending member 8 of the winding device 1 is connected to the upper end of the suspending piece 23.

When the main shaft 3 of the winding device 1 is rotated clockwise in FIG. 1, the eccentric cam is rotated on its own axis and is rotated around the rotation center axis of the main shaft 3. The external gear 10 and the rotation restricting plate 11 as one body are restricted in the rotation on its own axis and are rotated around the rotation center axis of the main shaft 3, and the internal gear 7 and the winding drum 6 as one body are rotated in reduction. The left end of the suspending member 8 and the wheel support member 21 rise, and the spare wheel put on the wheel support member 21 is wound up.

The spare wheel on the wheel support member 21 is wound up and the winding-off force in downward direction acts to the left end of the suspending member 8 by the self weight of the wheel support member 21 and the spare wheel on the wheel support member 21, and while the winding-off moment acts on the winding drum 6 and the internal gear 7 as one body, the right side projection 14 of the rotation restricting plate 11 abuts on the rotation restricting pin 15 serving also as the safety pin. The winding drum 6 and the internal gear 7 are not rotated reversely as long as the main shaft 3 is not rotated reversely or as long as the rotation restricting pin 15 serving also as the safety pin is not broken.

When the main shaft 3 is rotated reversely, the winding drum 6 is rotated reversely and the suspending member 8 is wound off and the spare wheel on the wheel support member 21 is wound off.

The winding device 1 is mounted at rear lower part of a car body V of a medium size passenger car such as a wagon also called a recreational vehicle as shown in FIG. 3, using right and left bolt holes 16 of the case 2, and a spare wheel T put on the wheel support member 21 is wound up and held at a rear lower surface of the car body V.

In this state, if large force is applied to the spare wheel T on the wheel support member 21 by collision of a motor vehicle, and the winding-off force acting to the side of the wheel support member 21 of the suspending member 8 becomes a set value larger than that at the normal use state, in the winding device 1, the rotation restricting pin 15 serving also as the safety pin with the right side projection 14 abutting thereon is broken, and the winding drum 6 is rotated reversely. The suspending member 8 is wound off, and the spare wheel T on the wheel support member 21 is sent out and the breakage of the suspending member 8 at the side of the wheel support member 21, i.e., the left end side is prevented.

If the rotation restricting pin 15 serving also as the safety pin is broken, being different from the prior art, since the winding drum 6 can be rotated reversely by many turns until the right end side of the suspending member 8 is strained, even if the winding-off force larger than that at the normal use state is applied to the side of the wheel support member 21 of the suspending member 8 continuously or intermittently for a long time, the breakage of the suspending member 8 at the side of the wheel support member 21 is prevented.

When the winding-off force applied to the side of the wheel support member 21 of the suspending member 8 becomes substantially constant value or more, being different from the prior art, irrespective of the position of the eccentric cam 9, the rotation restricting pin 15 serving also as the safety pin is always broken and the winding drum 6 is rotated reversely thereby the breakage of the suspending member 8 at the side of the wheel support member 21 is prevented.

When the winding-off force is applied to the side of the wheel support member 21 of the suspending member 8, distance between the contact point of the right side projection 14 abutting on the rotation restricting pin 15 serving also as the safety pin and the rotation center axis of the main shaft 3, that is, length of the arm of the moment by the reaction force, becomes substantially constant value irrespective of the position of the eccentric cam 9. In other words, amount of the reaction force of the right side projection 14 receiving from the rotation restricting pin 15 serving also as the safety pin, that is, amount of the force that the right side projection 14 is going to break the rotation restricting pin 15 serving also as the safety pin, becomes substantially constant value irrespective of the position of the eccentric cam 9 if the winding-off force W applied to the suspending member 8 is the same.

Figure 4:
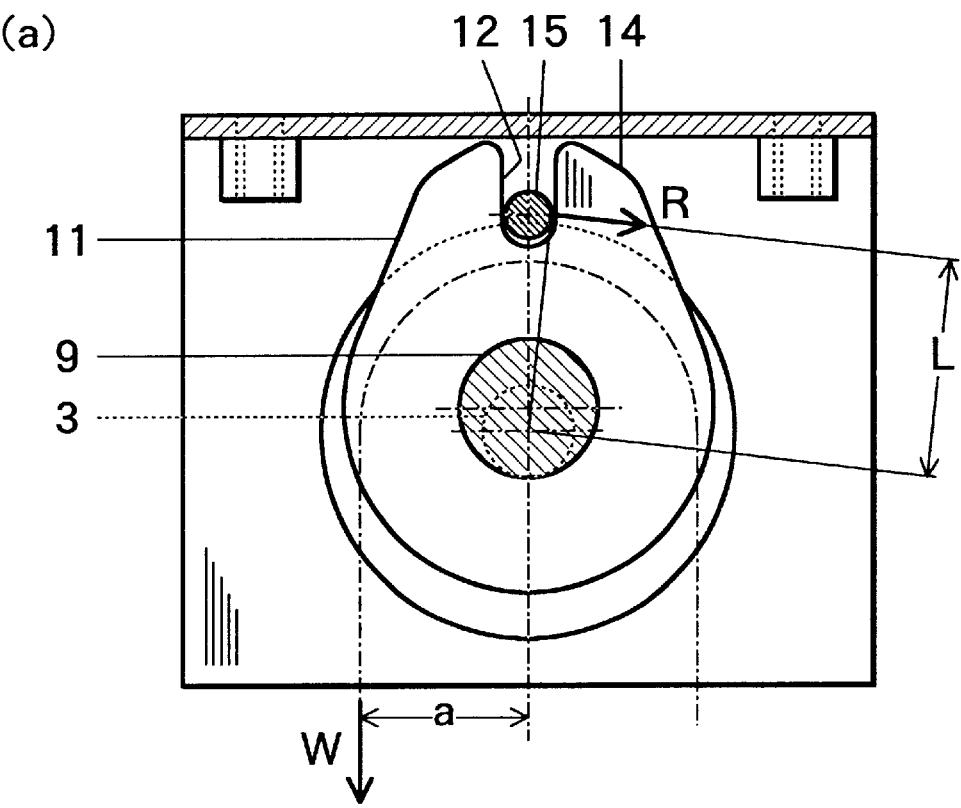
FIGS. 4(a) and 4(b) are explanation diagrams showing relation of distance between the point of the rotation restricting plate abutting on the rotation pin serving also as the safety pin and the rotation center axis of the main shaft, and the position of the eccentric cam, when the winding-off force is applied to the suspending member in the winding device, of the spare wheel holding apparatus.
Figure 4:
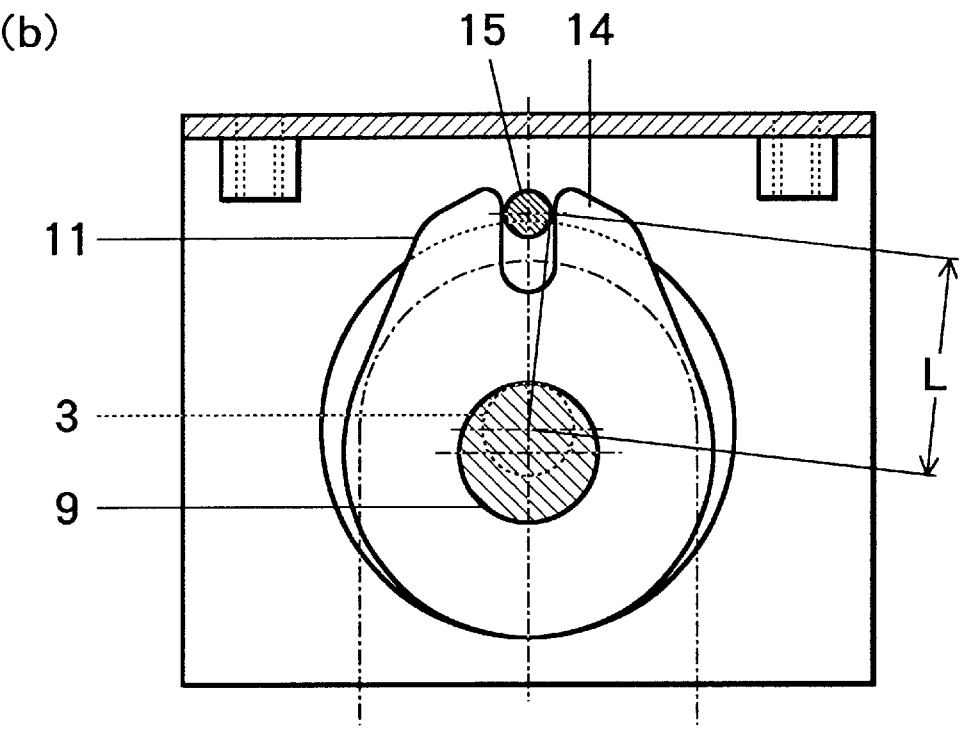

As shown in FIG. 4(a), when the center of the eccentric cam 9 is positioned at the side of the rotation restricting pin 15 serving also as the safety pin, i.e., at the upper side of the rotation center axis of the main shaft 3, the groove 12 of the rotation restricting plate 11 is arranged in the vertical direction and the right side projection 14 abuts on the right end of the circumferential surface of the rotation restricting pin 15 serving also as the safety pin, and distance between the contact point of the right end and the rotation center axis of the main shaft 3 becomes L. The distance L is length of the arm of the clockwise moment by the reaction force R. The clockwise moment R·L balances with the counterclockwise winding-off moment W·a.

On the contrary, as shown in FIG. 4(b), when the center of the eccentric cam 9 is positioned at the reverse side of the rotation restricting pin 15 serving also as the safety pin, i.e., at the lower side of the rotation center axis of the main shaft 3, the groove 12 is arranged in the vertical direction and the right side projection 14 abuts on the right end of the circumferential surface of the rotation restricting pin 15, and distance between the contact point of the right end and the rotation center axis of the main shaft 3, i.e., length of the arm of the clockwise moment by the reaction force R become the same value L.

As shown in FIG. 5(a), when the center of the eccentric cam 9 is positioned to the left side of the rotation center axis of the main shaft 3, the groove 12 is arranged a little slanted from the vertical direction and the night side projection 14 abuts on position quite a little lowered from the right end in the circumferential surface of the rotation restricting pin 15, and distance between the contact point of the position quite a little lowered from the right end and the rotation center axis of the main shaft 3 becomes L−minimal quantity δ. Since the minimal quantity δ can be neglected in comparison with the distance L, the above-mentioned distance L−minimal quantity δ, i.e., the length of the arm of the clockwise moment by the reaction force R become nearly the same value L.

Figure 5:
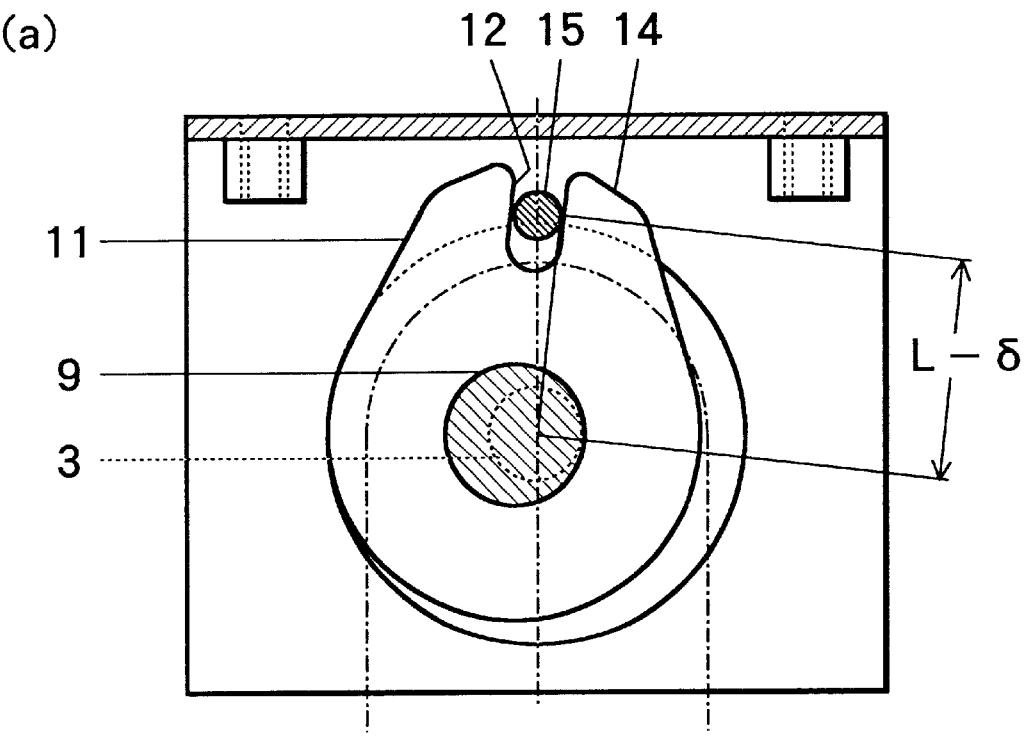
FIGS. 5(a) and 5(b) are explanation diagrams similar to FIGS. 4(a) and 4(b)
Figure 5:
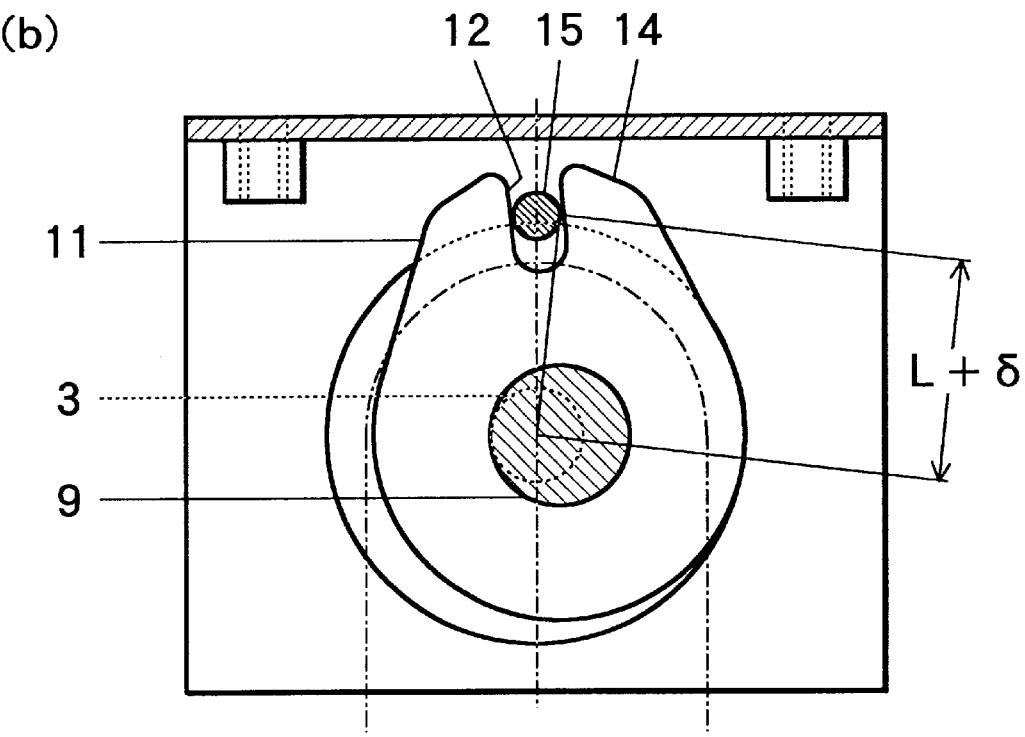
Figure 6:
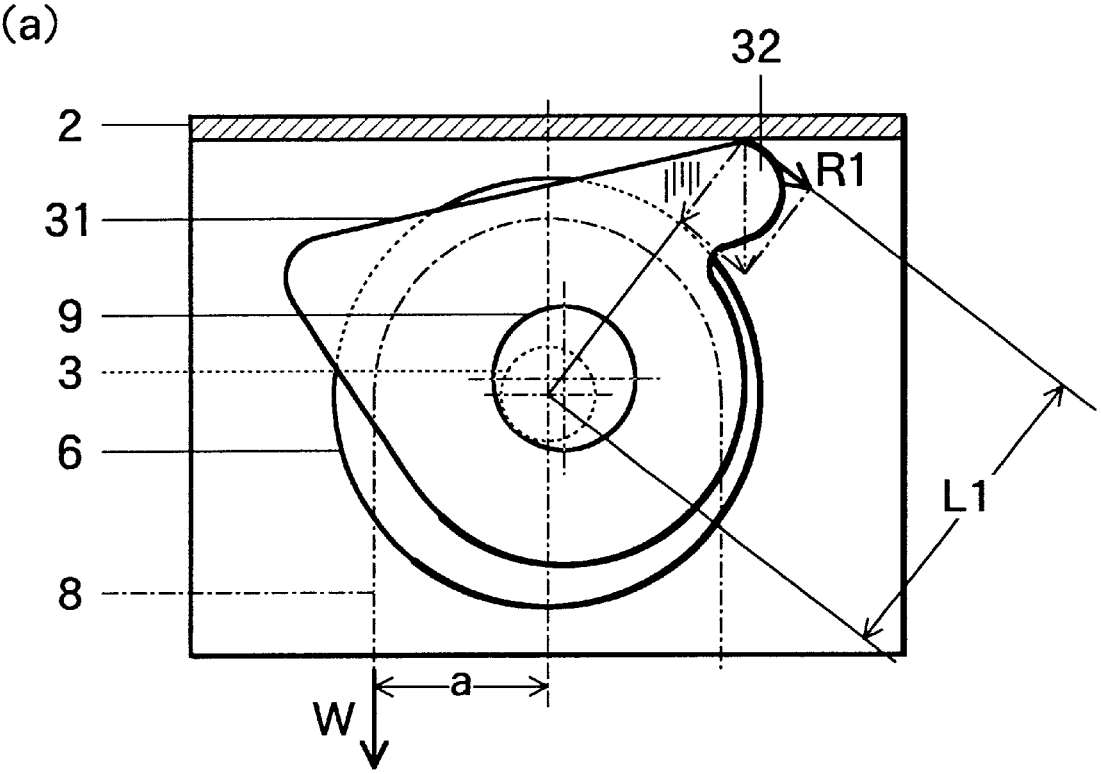
FIGS. 6(a) and 6(b) are explanation diagrams in a winding device of a spare wheel holding apparatus in the prior art showing relation of distance between the point of the right end of the rotation restricting plate abutting on the top plate of the case and the rotation center axis of the main shaft, and the position of the eccentric cam, when the winding-off force is applied to the suspending member.
Figure 6:
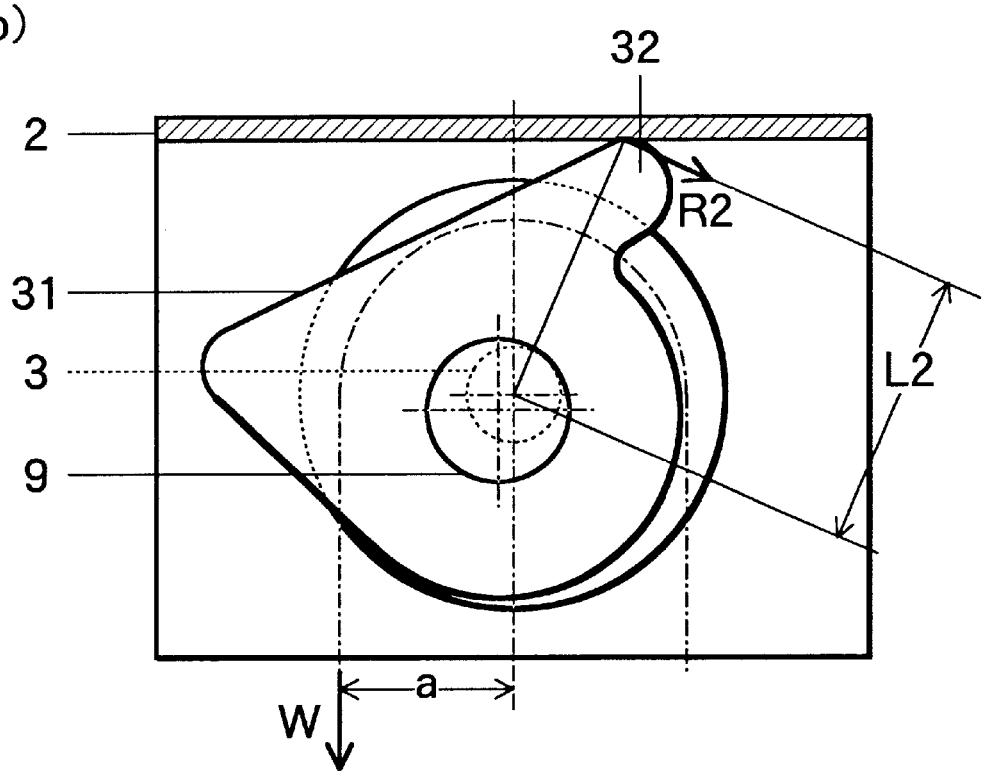

On the contrary, as shown in FIG. 5(*b*), when the center of the eccentric cam 9 is positioned at the right side of the rotation center axis of the main shaft 3, the groove 12 is a little slanted from the vertical direction reversely and the right side projection 14 abuts on position quite a little raised from the right end in the circumferential surface of the rotation restricting pin 15, and distance between the contact point of the position quite a little raised from the right end and the rotation center axis of the main shaft 3 becomes L+minimal quantity δ. Since the minimal quantity δ can be neglected in comparison with the distance L the length of the aim of the clockwise moment by the reaction force R becomes nearly the same value L.

Accordingly when the winding-off force is applied to the side of the wheel support member 21 of the suspending member 8, since distance between the contact point of the right side projection 14 abutting on the rotation restricting pin 15 and the rotation center axis of the main shaft 3 becomes substantially the same value L irrespective of the position of the eccentric cam 9, amount of the reaction force R of the right side projection 14 receiving from the rotation restricting pin 15, that is, amount of the force that the right side projection 14 going to break the rotation restricting pin 15 become substantially constant value irrespective of the position of the eccentric cam 9, if the winding-off force W applied to the suspending member 8 is the same.

As a result, the winding-off force of the suspending member 8 for the rotation restricting pin 15 serving also as the safety pin to be broken is scarcely varied by the position of the eccentric cam 9 and becomes substantially constant value.

What is claimed is:

1. A spare wheel holding apparatus adapted to prevent breakage of a suspending member, said apparatus comprising:

a wheel support member for supporting a wheel;

a suspending member having a falling end that connects to the wheel support member;

a winding device for winding up the suspending member, said winding device comprising:

a case;

a main shaft that is supported on the case;

a winding drum rotatably fitted to the main shaft, the winding drum being adapted to wind-up the suspending member; and a planetary gear mechanism comprising: an internal gear comprising a plurality of internal gear teeth arranged concentrically with the main shaft on a side of the winding drum; an eccentric cam formed as a single body with the main shaft and being eccentrically disposed with respect to the main shaft said cam having an external gear rotatably fitted concentric with the eccentric cam and intermeshing with the internal gear, the external gear having a plurality of teeth less than the number of internal gear teeth so that a large reduction ratio is obtained;

a rotation restricting plate joined to the winding drum and having a circumferential surface that is concentric with the main shaft; and a rotation restricting pin adapted to be placed through the case so the rotation restricting plate abuts the rotation restricting pin, thereby preventing movement of the winding drum when the rotation restricting pin is placed through the case, and permitting the winding drum to rotate when the rotation restricting pin is removed from the case;

wherein the rotation restricting pin is adapted to break and allow rotation of the winding drum and payout of the suspending member, thereby preventing breakage of the suspending member, when a winding-off force in excess of a predetermined force is applied to the suspending member.

2. An apparatus according to claim 1, wherein, when a winding-off force is applied to the suspending member, a distance between a contact point of the pin with the rotation restricting plate and the main shaft remains constant regardless of the position of the cam.

3. An apparatus according to claim 1, wherein the rotation restricting plate is provided with a groove in the direction from the circumferential surface toward the eccentric cam, and the rotation restricting pin projects through the groove when the pin is placed through the case.

4. The apparatus according to claim 2, wherein the rotation restricting plate is provided with a groove in the direction from the circumferential surface toward the eccentric cam, and the rotation restricting pin projects through the groove when the pin is placed through the case.

5. The apparatus according to claim 1, wherein the case is fixed to a lower surface of a body of a motor vehicle and the support member supports a spare wheel that is wound up and held adjacent said lower surface.

6. The apparatus according to claim 2, wherein the case is fixed to a lower surface of a body of a motor vehicle and the support member supports a spare wheel that is wound up and held adjacent said lower surface.

7. The apparatus according to claim 3, wherein the case is fixed to a lower surface of a body of a motor vehicle and the support member supports a spare wheel that is wound up and held adjacent said lower surface.

8. The apparatus according to claim 4, wherein the case is fixed to a lower surface of a body of a motor vehicle and the support member supports a spare wheel that is wound up and held adjacent said lower surface.

\* \* \* \* \*